No. 699,246. Patented May 6, 1902.
E. SAHLER.
FENCE WIRE STRETCHER.
(Application filed Dec. 20, 1901.)
(No Model.)
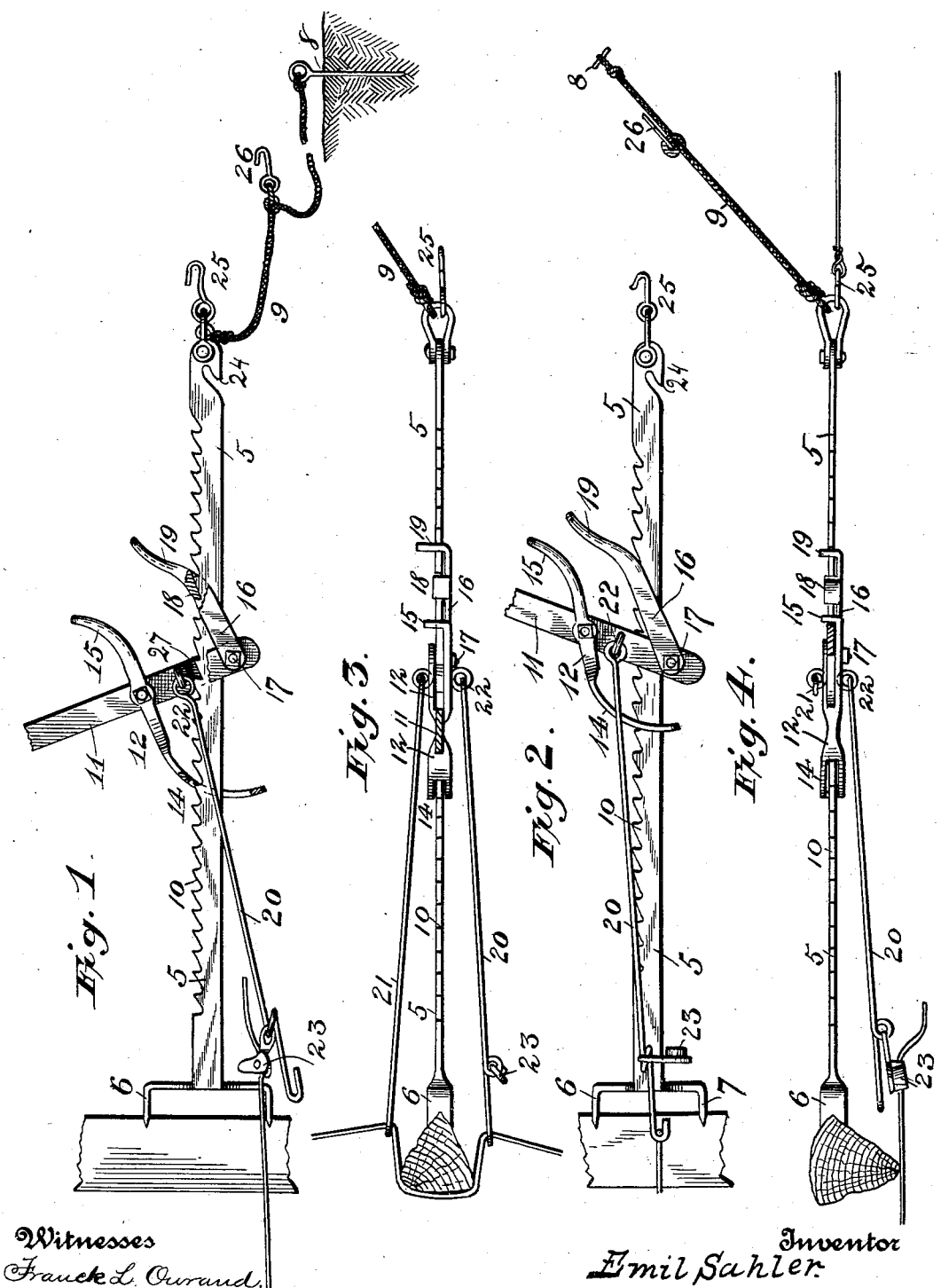
Witnesses
Franck L. Ourand.
G. E. Waller
Inventor
Emil Sahler
by W. R. Stevens, Attorney

UNITED STATES PATENT OFFICE.

EMIL SAHLER, OF WASECA, MINNESOTA.

FENCE-WIRE STRETCHER.

SPECIFICATION forming part of Letters Patent No. 699,246, dated May 6, 1902.

Application filed December 20, 1901. Serial No. 86,677. (No model.)

*To all whom it may concern:*

Be it known that I, EMIL SAHLER, a citizen of the United States, residing at Waseca, in the county of Waseca and State of Minnesota, have invented a new and useful Improvement in Fence-Wire Stretchers; and I do hereby declare the following to be a full, clear, and exact description of the same, reference being had to the accompanying drawings.

This invention relates to that class of implements used in stretching fence-wires to attach them to fence-posts; and its object is to provide in a single implement means whereby the operator may stretch new wires to fasten them to fence-posts, means for taking up the slack in wires already attached, and means for drawing together the ends of broken fence-wires and holding them while mending them.

To this end my invention consists in the construction and combination of parts forming a fence-wire stretcher hereinafter more fully described, and particularly set forth in the claims, reference being had to the accompanying drawings, in which—

Figure I shows in side elevation a fence-wire stretcher according to my invention in the act of tightening a new wire. Fig. II is a side elevation of the same wire-stretcher in service in the act of tightening a fence-wire where it is found to be slack midway. Fig. III is a plan view of the same wire-stretcher in service as in Fig. II. Fig. IV is a plan view of the stretcher in service as in Fig. II.

Numeral 5 represents the rack-bar, provided with two feet 6 7, each of which is forked at the end to stick into the wood of a fence-post or to straddle the corner thereof, and 8 represents an iron stake or pin to be driven into the ground and connected by a rope, chain, or other similarly pliable connection 9 with the outer end of the rack-bar 5. The upper side of the rack-bar is provided with teeth 10 throughout its length.

11 is a hand-lever bifurcated and mounted astride the bar 10 to slide freely thereon longitudinally.

12 is a pawl pivoted at 13 above the bar 5 to the lever 11, its free end 14 being adapted to drag freely backward over the teeth 10 and to engage the same when pushed forward.

15 is a thumb-latch at the opposite end of the pawl 12 for disengaging it from the teeth.

16 is a pawl pivoted at 17 to the lever 11 below the bar 5 at the opposite side of the line of teeth 10 from the pivot 13 and adapted to engage the teeth 10 at 18. This pawl also resists forward movement of the lever 11 on the bar 5, but slides freely backward over the teeth thereof, and 19 is a latch whereby this pawl may be lifted out of engagement with the teeth.

20 and 21 represent hooks pivoted at their rear ends 22 to the lever 11 about at the level of the teeth 10 on the bar 5. One of these hooks 20 is provided with any suitable kind of a grip or clutch 23 for engaging a fence-wire to pull the same endwise, and both of the hooks 20 21 are adapted to engage a wire to pull it crosswise around a post for tightening the wire.

24 represents one hook, and 25 and 26 represent other hooks, to which one end of a broken wire may be attached when the clutch 23 is attached to the other end for the purpose of drawing the two ends as nearly as practicable together for the purpose of joining them by inserting a link of other wire.

The operation is as follows: The feet 6 and 7 of the bar 5 being firmly planted against the post and the clutch 23 engaged with the wire to be stretched, the stake 8 is to be drawn back and to the side of the post opposite to that on which the wire is located, where it is to be driven into the ground to resist the sidewise pull upon the bar 5, as shown in Figs. III and IV. Now if lever 11 be pulled backward the pawl 12 will be drawn backward, while the pawl 16 engages one of the teeth 10 and serves as a fulcrum to the lever. Then if the lever 11 be pushed forward the pawl 12 will serve as a fulcrum, while pawl 16 is slid backward to a new point of engagement with the teeth 10. By thus reciprocating the lever 11 it may be made to travel the whole length of the bar 5 or far enough to tighten the wire, and when the wire is thus tightened the lever 11 may be left standing while the wire is being attached to the post. Now if a broken wire is to be mended one of the ends is to be taken, as before described, in the clutch 23, while the other is attached to some one of the hooks 24, 25, or 26. Then the lever 11 will be reciprocated upon the bar 5 until the two ends are drawn as near together as possible and both are as tight as required. Then the lever may be left standing while a link of new wire is put in to join the two ends. This stretching device could be operated when thus fastened between the two ends of a wire without resting against the post, because the wire would hold it up while the ends are being drawn together. For tightening a slack wire anywhere midway the feet 6 and 7 of the bar 5 are to be planted against the side of a post opposite to the slack wire. Then the hooks 20 and 21 are to be engaged with the wire, after which the lever 11 is to be operated, as before described, until the wire is drawn around the post sufficiently tight. Then the lever 11 is left standing while a new loop of wire is attached to the tightened wire near one hook 20, then passed around the post opposite to the main wire, and its other end attached to the main wire near hook 21, thus holding the wire as tightened. For this step in the operation of fence-wire tightening the pin 8 and its connecting-rope 9 are not absolutely needed, and yet they serve to prevent the whole stretcher from being accidently knocked down if this pin and rope are put in service. The lever 11 has no other fulcrum to engage the teeth 10 except the two pawls 12 and 16; but it has an internal shoulder 27, adapted to slide either way freely upon the teeth. The latch 15 may be borne down by the thumb while the latch 19 is raised by the finger of the same hand, pressing the two toward each other to disengage the two pawls 12 and 16 from the teeth 10 to set the lever 11 free to be pushed backward along the teeth to make a new start.

This implement has the great advantage of being a complete machine capable of drawing two ends of a wire toward each other without any outside support. It has the further advantage of being able to take up any amount of slack wire by simply reciprocating the lever 11, because the bar 5 may be made as long as required for any emergency. It is simple and mechanical in its working parts, convenient and reliable in stretching fence-wires and in holding them while being attached or mended, and it is comparatively inexpensive.

Having thus fully described my invention, what I claim as new, and desire to secure by Letters Patent, is the following:

In fence-wire stretchers, a bar having teeth along one side and provided with feet at one end to engage a post; a lever fitted near one end to slide freely longitudinally upon the said bar; two pawls pivoted to the lever at opposite sides of the line of said teeth and each adapted to engage the said teeth, each pawl being formed at one end as a latch, and the two latches being adjacent to each other and adapted to be pressed toward each other to disengage the pawls from the ratchet; and hooks freely hung to the lever for engaging wires, substantially as described.

In testimony whereof I affix my signature in presence of two witnesses.

EMIL SAHLER.

Witnesses:
HENRY GEIST,
ERNEST MENKE.